July 7, 1931.  E. R. MAURER ET AL  1,812,887

STEERING MECHANISM FOR DELIVERY VEHICLES

Filed Aug. 1, 1929

INVENTORS
Edwin R. Maurer
Donald M. Ferguson

BY Whittemore Hulbert Whittemore & Belknap  ATTORNEYS

Patented July 7, 1931

1,812,887

UNITED STATES PATENT OFFICE

EDWIN R. MAURER, OF DETROIT, AND DONALD M. FERGUSON, OF HIGHLAND PARK, MICHIGAN, ASSIGNORS TO DIVCO-DETROIT CORPORATION, OF DETROIT, MICHIGAN, A CORPORATION OF MICHIGAN

STEERING MECHANISM FOR DELIVERY VEHICLES

Application filed August 1, 1929. Serial No. 382,815.

The invention relates to steering mechanism for vehicles of the house-to-house delivery type and more particularly to an improvement in a steering mast designed for use in the center of a vehicle for operation from the side operating platforms thereof. A vehicle of the type mentioned is described in the application of George M. Bacon filed November 21, 1927, bearing Serial No. 234,765.

The primary object of our invention is to provide a removable steering mast that may be quickly and easily locked to the steering mechanism when it is placed thereon so as to prevent any possibility of the mast becoming disengaged while the vehicle is in operation.

Another object is to provide a locking device for a steering handle requiring a definite manual manipulation of an auxiliary part to release the same.

Figure 1:
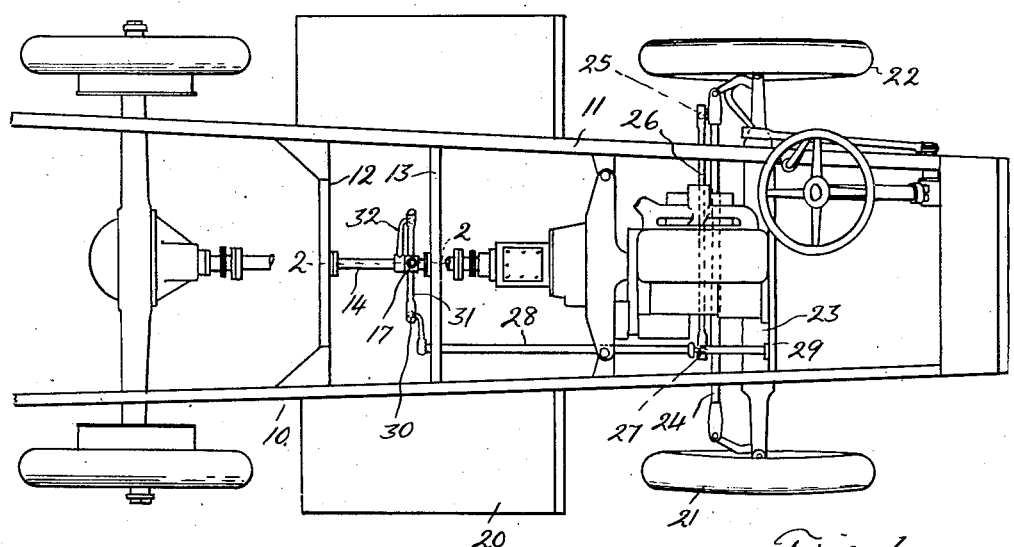
Figure 2:
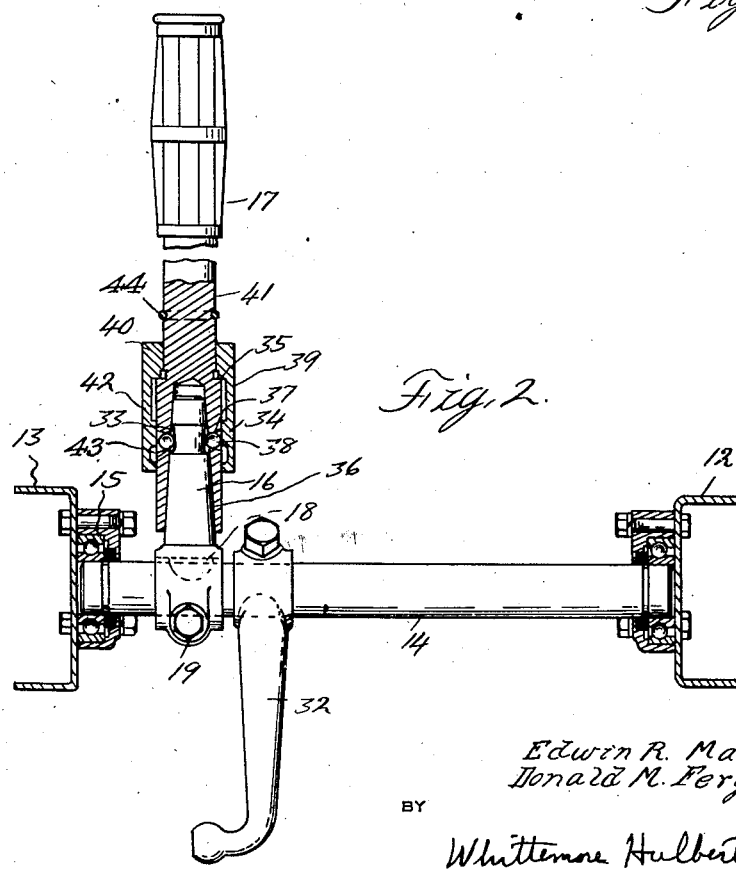

These and other objects are attained by providing the novel construction hereinafter more fully described and illustrated in the accompanying drawings wherein Figure 1 is a plan view of a vehicle chassis showing the steering mechanism;

Figure 2 is a section through the steering mast on line 2—2 of Figure 1.

Referring now to the construction as illustrated in the drawings, 10 represents the vehicle chassis, 11 the longitudinal frame side members, 12 and 13 frame cross members and 14 a steering shaft journaled in bearings 15 on the cross members and arranged at the center of the chassis. Rising upwardly from the shaft is a hub 16 for the center steering mast 17, the hub being keyed at 18 to the shaft and also clamped thereto by the bolt 19. The hub 16 is adapted to project little, if any, above the floor (not shown) of the vehicle so that when the mast 17 is removed the floor space around the hub may be used for carrying boxes or other articles which it is desired to transport. On the other hand, when it is desired to use the vehicle for house-to-house delivery purposes the floor adjacent the hub is kept clear to permit lateral oscillation of the steering mast in order to steer the vehicle from the side operating platforms 20.

The steering connections as illustrated are as follows: 21 and 22 represent the front steering wheels pivotally mounted on the front axle 23 and tied together by the steering cross arm 24. A ball arm 25 on the cross arm is connected to a drag link 26 extending transversely of the frame. The other end of the drag link engages a ball lever 27 projecting downwardly from a longitudinal steering shaft 28, which in turn is journaled to frame cross members 13 and 29. Another ball arm 30 at the end of shaft 28 is arranged to engage drag link 31 which connects the same to the ball lever 32 depending from shaft 14. Thus it will be observed that rocking of the steering mast and shaft 14 transversely of the chassis results in the movement of the front wheels thereby steering the vehicle.

As heretofore stated, the object of the present invention is to provide an automobile locking mechanism between the hub 16 and the mast 17 so constructed as to insure that the steering mast will be securely held to the hub during operation of the vehicle. The construction must also be "fool proof" so that even a careless placing of the mast on the hub will lock the same in position, for it should be realized that if the handle were not locked in position the operator might be thrown from the vehicle when the mast was inclined during a turning movement.

The improved construction for accomplishing the results heretofore mentioned is as follows: The hub 16 is tapered on its outer surface and provided with an annular recess 33 between the ends thereof. The mast 17 is enlarged at its lower end forming a cylindrical outer surface 34 and shoulder 35. It is also provided with a tapering socket 36 adapted to fit over the tapered hub and has a plurality of radial apertures 37 in alignment with recess 33 when the socket engages the hub. The apertures are tapered inwardly to receive balls 38 of a diameter greater than the thickness of the socket shell at this point. 39 is a collar having an upper portion 40 slidable on the shank 41 of the mast and having a lower portion 42 surrounding the enlarged portion of the mast. The collar is slidable on the mast between shoulder 35 and a stop ring 44 and has an annular recess 43 within the same adapted to register with the radial apertures 37 when in its upper portion.

To mount the mast upon the hub the operator places the socket 36 on the tapered hub 16, then raises the collar 39 until the annular recess 43 registers with aperture 37 whereupon the balls 38 move outwardly and allow the tapered socket to move down into engagement with the tapered hub. In this position the balls are in alignment with the recess 33. The collar is then released and falls by gravity thereby forcing the balls inwardly into engagement with recess 33. The mast is thus locked in position and can not be removed from the hub until the collar is first raised sufficiently to register recess 43 with the balls.

With the construction as above set forth, it will be readily apparent that the mast can not be placed on the hub and used to effectively operate the vehicle until it is locked in position. If the socket were manually placed on the hub without raising the collar it would be at once apparent to the operator that it was not properly mounted because the balls would hold the socket away from the hub and permit it to rock upon the hub.

What we claim as our invention is:

1. The combination of a vehicle, a steering element adjacent the floor of the vehicle, a removable operating handle engageable with said element at the floor of the vehicle, and means for automatically locking said handle to said steering element releasable by a manual operation.

2. The combination of a vehicle, a steering element adjacent the floor of the vehicle, a removable operating handle engageable with said element at the floor of the vehicle, means for locking said handle to said steering element and manually operable means for releasing said locking means.

3. The combination of a vehicle, a steering element adjacent the floor of the vehicle, a tapered shank on said element, a handle having a socket engageable with said shank, said socket having radial recesses therein, balls in said recess, and a collar slidable on said socket and engageable with said balls, said collar having an internal recess adapted to register with said balls when said collar is in its upper position.

4. The combination of a vehicle, a steering element adjacent the floor of the vehicle, a tapered shank on said element having an annular groove therein, a handle having a tapered socket provided with radial apertures, balls in said apertures of greater diameter than the thickness of said socket at said apertures, a collar slidable on said socket, upper and lower abutments on said socket, said collar having a recess registering with said balls when said collar engages upper abutment.

5. The combination of a vehicle, a steering element adjacent the floor of the vehicle, a removable operating handle engageable with said element at the floor of the vehicle, locking means in said handle engageable with said steering element, gravity operated means for maintaining said locking means operative, and means permitting a sliding movement of said gravity operated means to release said locking means.

6. The combination of a vehicle, a rock shaft journaled therein, a tapered shank on said shaft adjacent the floor of the vehicle adapted to oscillate in a vertical plane, said shank having an annular groove therein, a shaft extending upwardly above the floor of the vehicle and having a socket engageable with said shank, a collar slidable on said shaft, and locking means held in locking position by the weight of said collar.

7. The combination of a vehicle, a steering element adjacent the floor of the vehicle, a shank on said element, a handle having a socket adapted to engage said shank, said socket having a radial recess, a locking element in said recess, and a collar adjustable on said socket and engageable with said locking element, said collar having an internal recess adapted to register with said locking element when said collar is in one of its adjusted positions.

8. In a mechanism of the character described a steering element having a shank, a removable handle having a socket engageable with said shank and provided with a radial opening, a locking element in said opening adapted to engage said shank and a member adjustably mounted on said socket operable in one position of adjustment to move said locking element into engagement with said shank for securing the handle thereto and in another position of adjustment permitting the locking element to move out of engagement with the shank to allow the handle to be detached therefrom.

9. In a mechanism of the character described, a steering element having a shank, a removable handle having a socket engageable with said shank and provided with a radial opening, a locking element in said opening adapted to engage said shank, and a sleeve slidably mounted on said socket operable to move said locking element into locking engagement with said shank for securing the handle thereto and to permit the locking element to move out of engagement with the shank to allow the handle to be detached therefrom.

In testimony whereof we affix our signatures.

EDWIN R. MAURER.
DONALD M. FERGUSON.